United States Patent
Merritt et al.

(10) Patent No.: US 8,523,530 B2
(45) Date of Patent: Sep. 3, 2013

(54) TURBINE ROTOR FOR AIR CYCLE MACHINE

(75) Inventors: Brent J. Merritt, Southwick, MA (US); Harold W. Hipsky, Willington, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 458 days.

(21) Appl. No.: 12/974,187

(22) Filed: Dec. 21, 2010

(65) Prior Publication Data

US 2012/0156046 A1   Jun. 21, 2012

(51) Int. Cl.
*F01D 5/14* (2006.01)
*F01D 5/04* (2006.01)

(52) U.S. Cl.
USPC .................. 416/223 B; 416/243; 416/DIG. 2

(58) Field of Classification Search
USPC ...................................... 416/223 R
See application file for complete search history.

(56) References Cited

U.S. PATENT DOCUMENTS

| | | | |
|---|---|---|---|
| 4,967,565 A | 11/1990 | Thomson et al. | |
| 5,014,518 A | 5/1991 | Thomson et al. | |
| 5,113,670 A | 5/1992 | McAuliffe et al. | |
| 5,133,194 A | 7/1992 | Army, Jr. et al. | |
| 5,142,762 A | 9/1992 | Dziorny et al. | |
| 5,213,473 A * | 5/1993 | Fiala | 416/183 |
| 5,224,842 A | 7/1993 | Dziorny et al. | |
| 5,249,934 A | 10/1993 | Merritt et al. | |
| 5,309,735 A | 5/1994 | Maher, Jr. et al. | |
| 5,310,311 A | 5/1994 | Andres et al. | |
| 5,784,894 A | 7/1998 | Army, Jr. et al. | |
| RE36,101 E | 2/1999 | Andres et al. | |
| 5,921,683 A | 7/1999 | Merritt et al. | |
| 6,058,715 A | 5/2000 | Strang et al. | |
| 6,062,819 A * | 5/2000 | Zangeneh et al. | 416/186 R |
| 6,427,471 B1 | 8/2002 | Ando et al. | |
| 7,198,470 B2 * | 4/2007 | Enomoto et al. | 416/185 |
| 7,502,717 B2 | 3/2009 | Elpern et al. | |
| 7,779,644 B2 | 8/2010 | Decrisantis et al. | |
| 8,360,730 B2 * | 1/2013 | Chen et al. | 416/188 |

* cited by examiner

*Primary Examiner* — Nathaniel Wiehe
*Assistant Examiner* — Jeffrey A Brownson
(74) *Attorney, Agent, or Firm* — Carlson, Gaskey & Olds, P.C.

(57) ABSTRACT

A turbine rotor for an Air Cycle Machine includes a hub with a multiple turbine blades which extend therefrom, each of the multiple of turbine blades defined by a set of coordinates.

24 Claims, 3 Drawing Sheets

TURBINE ROTOR FOR AIR CYCLE MACHINE

BACKGROUND

The present disclosure relates to an air cycle machine, and more particularly to a turbine rotor therefor.

An air cycle machine may include a centrifugal compressor and a centrifugal turbine mounted for co-rotation on a shaft. The centrifugal compressor further compresses partially compressed air, such as bleed air received from a compressor of a gas turbine engine. The compressed air discharges to a downstream heat exchanger or other use before returning to the centrifugal turbine. The compressed air expands in the turbine to thereby drive the compressor. The air output from the turbine may be utilized as an air supply for a vehicle, such as the cabin of an aircraft.

SUMMARY

A turbine rotor for an Air Cycle Machine according to an exemplary aspect of the present disclosure includes a hub with a multiple turbine blades which extend therefrom, each of the multiple of turbine blades defined by a set of X-coordinates, Y-coordinates and Z-coordinates in any of Table B-1 and B-2 or Table S-1 and S-2 scaled by a desired factor, the X-coordinate is the tangential direction, the Y-coordinate is the axial direction, and the Z-coordinate is the radial direction.

A turbine rotor for an Air Cycle Machine according to an exemplary aspect of the present disclosure includes a hub with a multiple turbine blades which extend therefrom, each of the multiple of turbine blades have a tip contour defined by a set of points in Table C-1 scaled by a desired factor, the set of points include paired axial dimension K from a centerline of the turbine rotor and a radial dimension J from a reference surface.

A turbine rotor for an Air Cycle Machine according to an exemplary aspect of the present disclosure includes a hub with a multiple turbine blades which extend therefrom, the hub has a hub contour defined by a set of points in Table C-1 scaled by a desired factor, the set of points include paired axial dimension M from a centerline of the turbine rotor and a radial dimension L from a reference surface.

An Air Cycle Machine according to an exemplary aspect of the present disclosure includes a turbine rotor with a multiple turbine blades, each of the multiple of turbine blades having a set of X-coordinates, Y-coordinates and Z-coordinates defined in any of Table B-1 and B-2 or Table S-1 and S-2 scaled by a desired factor, the X-coordinate is the tangential direction, the Y-coordinate is the axial direction, and the Z-coordinate is the radial direction.

A method of installing a turbine rotor in an Air cycle Machine according to an exemplary aspect of the present disclosure includes mounting a turbine rotor with a multiple turbine blades within a turbine shroud to at least partially define a turbine flowpath, each of the multiple of turbine blades having a set of X-coordinates, Y-coordinates and Z-coordinates defined in any of Table B-1 and B-2 or Table S-1 and S-2 scaled by a desired factor, the X-coordinate is the tangential direction, the Y-coordinate is the axial direction, and the Z-coordinate is the radial direction.

BRIEF DESCRIPTION OF THE DRAWINGS

Various features will become apparent to those skilled in the art from the following detailed description of the disclosed non-limiting embodiment. The drawings that accompany the detailed description can be briefly described as follows.

DETAILED DESCRIPTION

Figure 1:
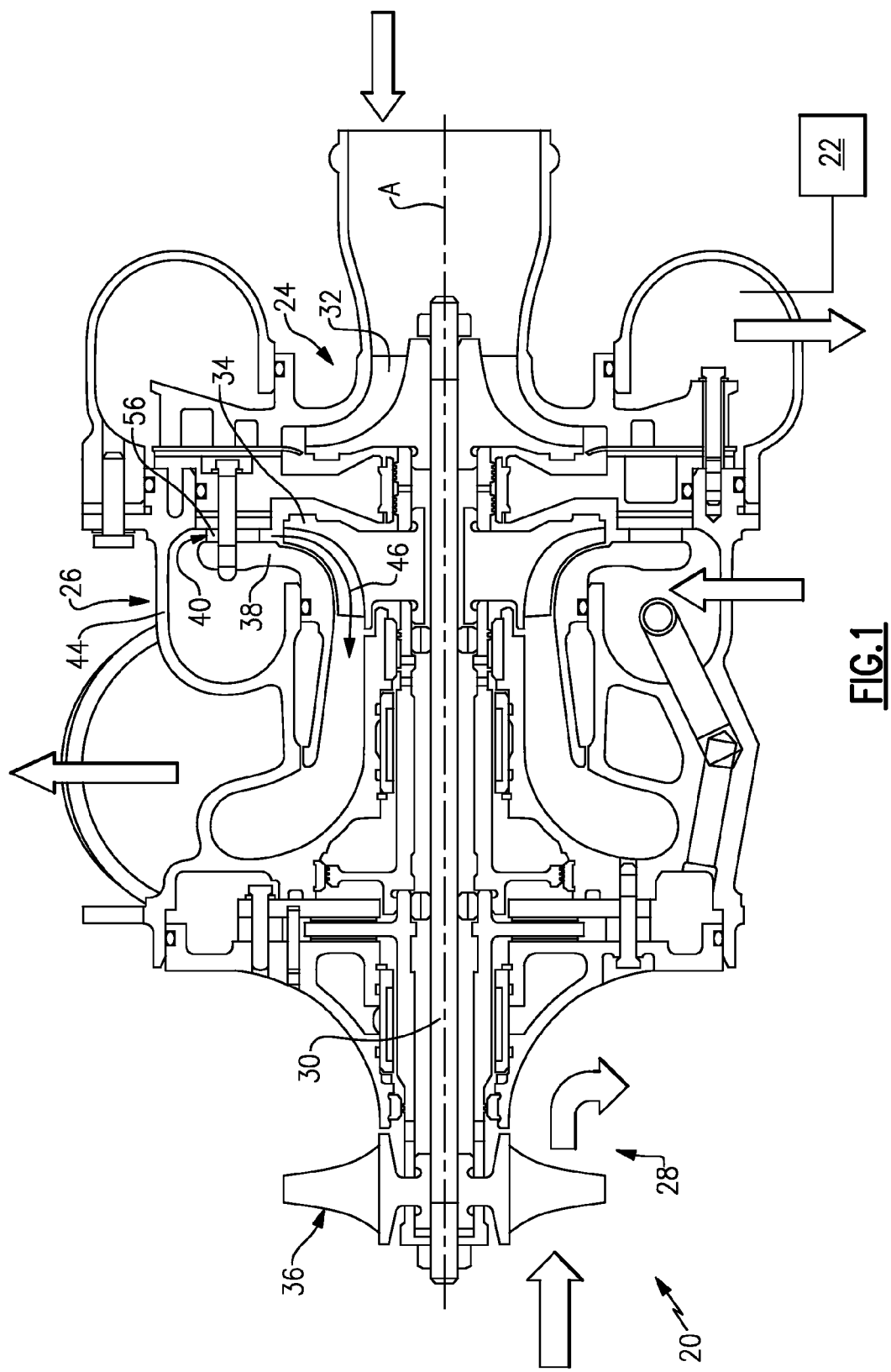
FIG. 1 illustrates a schematic sectional view of an example air cycle machine.

FIG. 1 schematically illustrates an example air cycle machine 20 ("ACM") that is incorporated into an air supply system 22 of a vehicle, such as an aircraft, helicopter, or land-based vehicle. The ACM 20 includes a compressor section 24, a turbine section 26 and a fan section 28 that are generally disposed about a main shaft 30, such as a tie rod. The compressor section 24 includes a compressor rotor 32, the turbine section 26 includes a turbine rotor 34, and the fan section 28 includes a fan rotor 36. The compressor rotor 32, turbine rotor 34, and fan rotor 36 are secured on the main shaft 30 for co-rotation about an axis A.

The turbine section 26 generally includes the turbine rotor 34, a turbine shroud 38 and a turbine nozzle 40 contained within a turbine housing section 44. The turbine section 26 is located axially between the fan section 28 and the compressor section 24. The turbine shroud 38 is attached axially downstream of the turbine nozzle 40 to define a turbine flowpath 46 for the turbine rotor 34.

Figure 2:
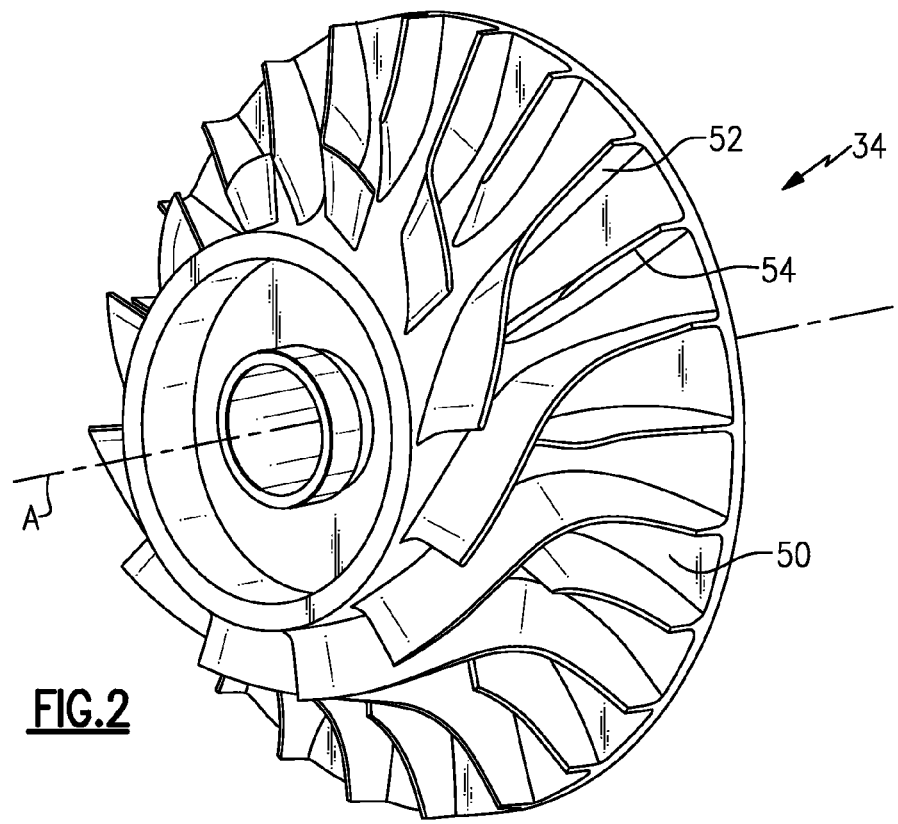
FIG. 2 illustrates a perspective view of a turbine rotor.
Figure 3:
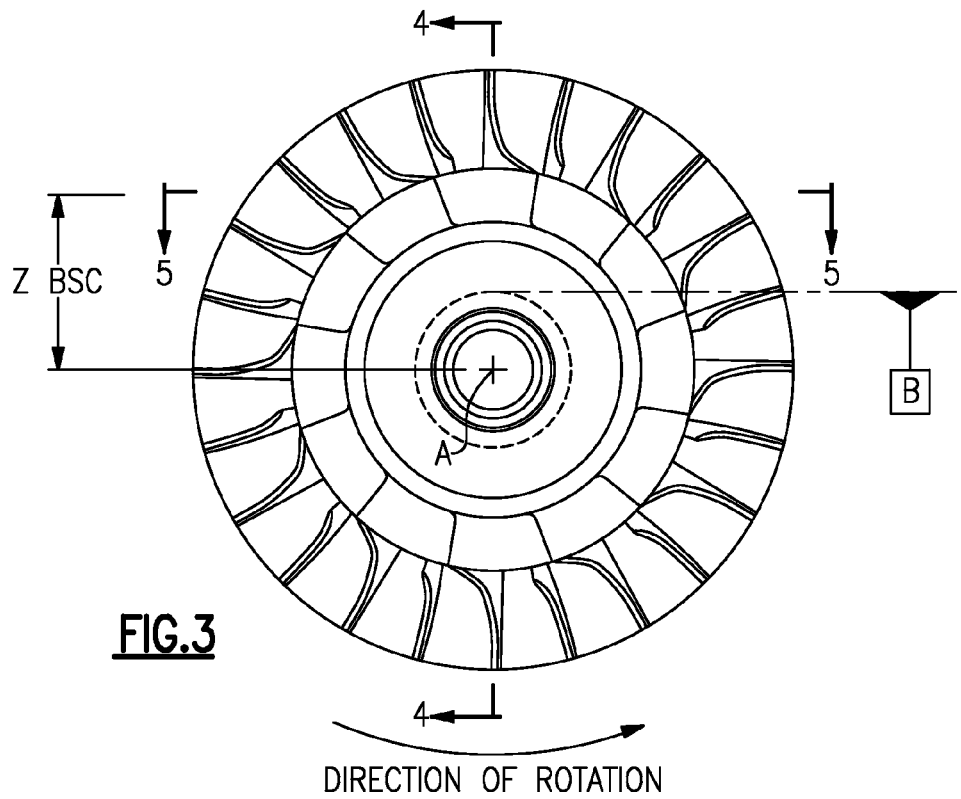
FIG. 3 illustrates a front view of the turbine rotor.
Figure 4:
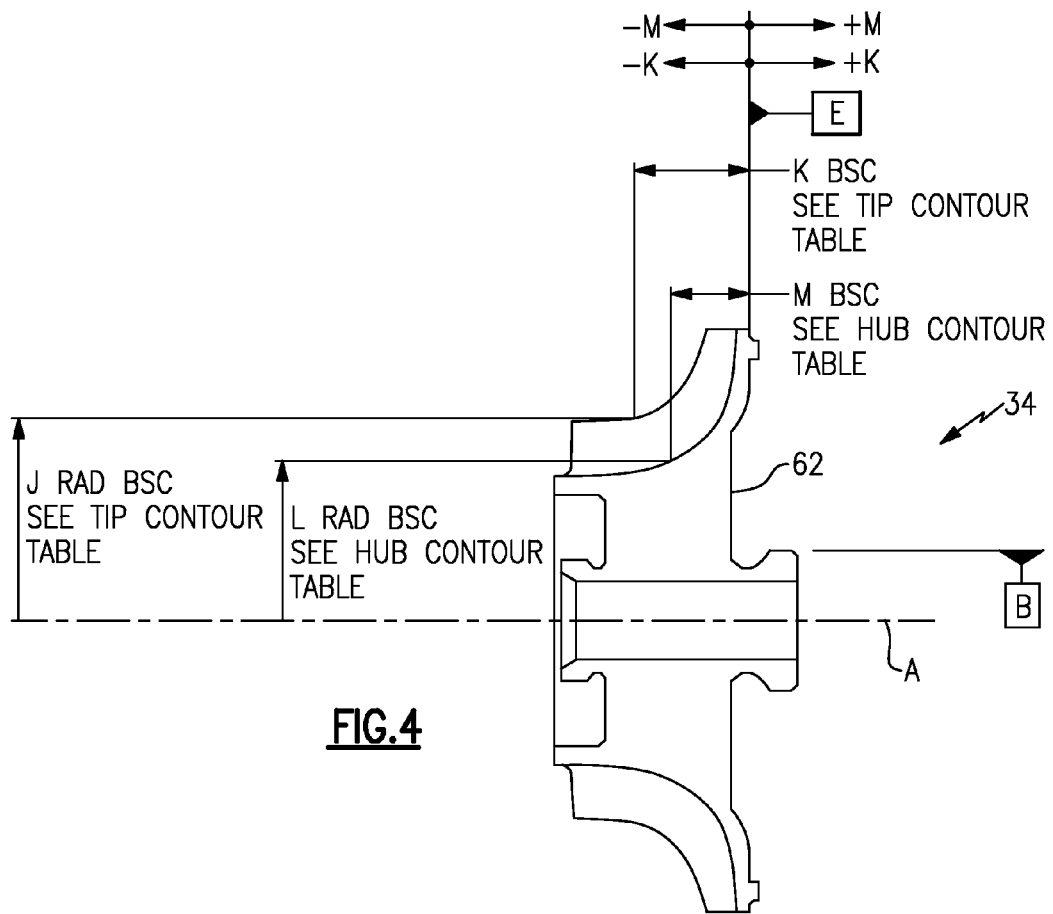
FIG. 4 is a sectional view of the turbine rotor taken along line 4-4 in FIG. 3.

With reference to the perspective view of the turbine rotor 34 shown in FIG. 2, the front view of FIG. 3 and the cross-sectional view of FIG. 4, the turbine rotor 34 generally includes a hub 50 with a multiple of turbine main blades 52 and a multiple of turbine splitter blades 54. The multiple of turbine main blades 52 and the multiple of turbine splitter blades 54 are equally spaced and alternate about the hub 50. Turbine vanes 56 of the turbine nozzle 40 are located upstream of the turbine main blades 52 and the turbine splitter blades 54.

Figure 5:
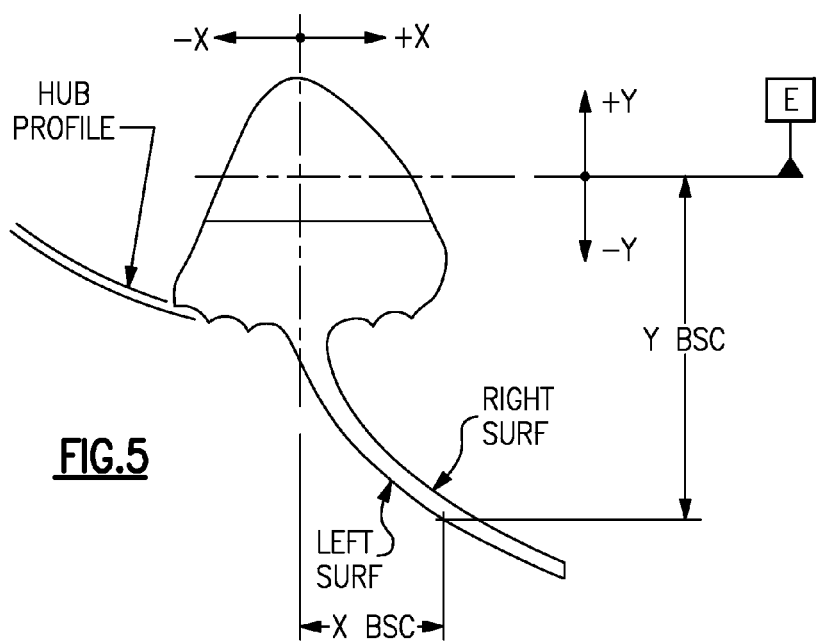
FIG. 5 is a sectional view of the turbine rotor taken along line 4-4 in FIG. 3.

The turbine blades 52, 54 and the turbine vanes 56 may be designed with computational fluid dynamics (CFD) analytical software and are optimized to meet the specific performance requirements of a specific ACM. Each of the turbine blade 52, 54 includes a left surface 58 and right surface 60 (FIG. 5). The shape of the turbine blade 52, 54 may be defined by a set of points in, for example, Cartesian coordinates along the boundary thereof.

With reference to FIG. 5, each of the turbine blades 52, 54 includes a left surface 58 and right surface 60 (FIG. 5). The shape of the turbine blade 52, 54 may be defined by a set of points in, for example, Cartesian coordinates which define a boundary thereof. Because of the difficulty involved in giving an adequate word description of the three-dimensional surface shape of each blade 52, 54 described herein, coordinates for one non-limiting dimensional embodiment therefore are set forth in main blade 52 surface Table B-1; B-2 and for the splitter blade 54 surface Table S-1; S-2. Characteristics of the shape may change from one to another and each may be directly scaled up or scaled down by a desired factor to meet different requirements.

The Tables are shown in a Cartesian coordinate system for X, Y and Z of the airfoil surface. The Cartesian coordinate system has orthogonally related X, Y and Z axes with the Z-axis extending generally in a radial direction relative to the axis of Rotation A and related with respect to Datum B. The X and Y coordinate values for determining the airfoil surface at each radial location are provided with respect to Z, wherein Z coordinate values in the Tables disclosed herein represent a non-dimensionalized value equal to one (1) at Datum B. That is, the disclosed, non-dimensionalized value Z in the Tables is provided as a ratio with respect to Datum B. It should be understood that a variety of reference Datums may alternatively or additionally be used.

By defining X and Y coordinate values at selected locations in the radial direction, i.e., in a Z direction with respect to Datum B, the left and right surfaces of the airfoil are ascertained. By connecting the X and Y values with smooth continuing arcs, each profile surface at the associated radial distance Z is defined. The surface profiles at the various radial locations between the radial distances Z are thereby ascertained by connecting adjacent surface profiles. Although the X, Y, and Z axes are oriented in the above fashion, it should be appreciated that the X, Y, and Z axes may have any orientation provided that the axes are orthogonally oriented with respect to each other and one axis extends along a height of the blade.

The Table values are provided in inches, and represent actual airfoil profiles at ambient, non-operating or non-hot conditions for an uncoated airfoil, the coatings for which are described below.

TABLE B-1

Main Blade Right Surf

| X BSC | Y BSC | Ratio (Z BSC/-B-) |
|---|---|---|
| 0.6483 | −0.8685 | 1.0505 |
| 0.6258 | −0.8667 | 1.0142 |
| 0.6033 | −0.8648 | 0.9777 |
| 0.4760 | −0.8104 | 0.9362 |
| 0.4363 | −0.7683 | 1.0330 |
| 0.4840 | −0.7808 | 1.1041 |
| 0.5011 | −0.7729 | 1.2025 |
| 0.4380 | −0.7338 | 1.2533 |
| 0.3804 | −0.7041 | 1.2411 |
| 0.3297 | −0.6831 | 1.1698 |
| 0.2474 | −0.6319 | 1.1174 |
| 0.2076 | −0.5900 | 1.1920 |
| 0.2254 | −0.5962 | 1.2829 |
| 0.2454 | −0.6037 | 1.3718 |
| 0.1567 | −0.5255 | 1.4231 |
| 0.1334 | −0.5030 | 1.3892 |
| 0.1121 | −0.4788 | 1.3560 |
| 0.0765 | −0.4256 | 1.2914 |
| 0.0487 | −0.3600 | 1.2906 |
| 0.0370 | −0.3196 | 1.3893 |
| 0.0537 | −0.3789 | 1.4990 |
| 0.0420 | −0.3536 | 1.6029 |
| 0.0277 | −0.2711 | 1.6161 |
| 0.0311 | −0.2127 | 1.5868 |
| 0.0259 | −0.1535 | 1.6920 |
| 0.0224 | −0.1810 | 1.8310 |
| 0.0235 | −0.2315 | 1.8466 |
| 0.0203 | −0.2299 | 1.9647 |
| 0.0166 | −0.1759 | 2.0133 |
| 0.0152 | −0.1342 | 2.0080 |

TABLE B-2

Main Blade Left Surf

| X BSC | Y BSC | Ratio (Z BSC/-B-) |
|---|---|---|
| 0.5514 | −0.9072 | 0.8487 |
| 0.6048 | −0.9082 | 0.9109 |
| 0.6209 | −0.8785 | 1.0827 |

TABLE B-2-continued

Main Blade Left Surf

| X BSC | Y BSC | Ratio (Z BSC/-B-) |
|---|---|---|
| 0.5351 | −0.8524 | 1.0532 |
| 0.4514 | −0.8401 | 0.9585 |
| 0.3823 | −0.7886 | 1.0185 |
| 0.4053 | −0.7784 | 1.1112 |
| 0.4295 | −0.7700 | 1.2025 |
| 0.3246 | −0.7023 | 1.2721 |
| 0.2687 | −0.6925 | 1.1484 |
| 0.2040 | −0.6491 | 1.1314 |
| 0.1940 | −0.6215 | 1.2384 |
| 0.2206 | −0.6265 | 1.3266 |
| 0.1535 | −0.5601 | 1.4102 |
| 0.1249 | −0.5387 | 1.3753 |
| 0.0998 | −0.5250 | 1.2875 |
| 0.0527 | −0.4735 | 1.2173 |
| 0.0291 | −0.4151 | 1.3540 |
| 0.0495 | −0.4381 | 1.4405 |
| 0.0336 | −0.4013 | 1.5338 |
| 0.0051 | −0.3413 | 1.5536 |
| −0.0219 | −0.2488 | 1.4994 |
| −0.0293 | −0.1947 | 1.5412 |
| −0.0227 | −0.2138 | 1.6881 |
| −0.0093 | −0.2702 | 1.7115 |
| −0.0067 | −0.2622 | 1.8374 |
| −0.0207 | −0.1733 | 1.8750 |
| −0.0215 | −0.1416 | 1.9345 |
| −0.0169 | −0.1485 | 2.0673 |
| −0.0109 | −0.2078 | 2.0721 |

TABLE S-1

Splitter Blade Right Surf

| X BSC | Y BSC | Ratio (Z BSC/-B-) |
|---|---|---|
| 0.0684 | −0.4241 | 1.4036 |
| 0.0620 | −0.4038 | 1.3676 |
| 0.0354 | −0.3010 | 1.3574 |
| 0.0335 | −0.2975 | 1.4259 |
| 0.0354 | −0.3253 | 1.5187 |
| 0.0413 | −0.3519 | 1.6111 |
| 0.0296 | −0.2589 | 1.5600 |
| 0.0309 | −0.1870 | 1.5603 |
| 0.0289 | −0.2195 | 1.6602 |
| 0.0254 | −0.2700 | 1.7067 |
| 0.0234 | −0.2766 | 1.7846 |
| 0.0250 | −0.2135 | 1.7934 |
| 0.0215 | −0.1531 | 1.8292 |
| 0.0214 | −0.2141 | 1.9146 |
| 0.0206 | −0.2307 | 1.9555 |
| 0.0187 | −0.2008 | 1.9863 |
| 0.0165 | −0.1559 | 1.9907 |
| 0.0141 | −0.1305 | 2.0407 |
| 0.0140 | −0.1821 | 2.1069 |
| 0.0150 | −0.2006 | 2.1095 |

TABLE S-2

Splitter Blade Left Surf

| X BSC | Y BSC | Ratio (Z BSC/-B-) |
|---|---|---|
| 0.0716 | −0.4401 | 1.4947 |
| 0.0661 | −0.4379 | 1.4450 |
| 0.0606 | −0.4356 | 1.3952 |
| 0.0353 | −0.4159 | 1.3065 |
| 0.0060 | −0.3755 | 1.2843 |
| −0.0006 | −0.3411 | 1.4346 |
| 0.0061 | −0.3526 | 1.4818 |
| 0.0169 | −0.3635 | 1.5926 |
| −0.0037 | −0.3053 | 1.6244 |
| −0.0177 | −0.2567 | 1.5649 |

TABLE S-2-continued

Splitter Blade Left Surf

| X BSC | Y BSC | Ratio (Z BSC/-B-) |
|---|---|---|
| −0.0255 | −0.2255 | 1.5511 |
| −0.0293 | −0.1832 | 1.5715 |
| −0.0229 | −0.2013 | 1.7247 |
| −0.0129 | −0.2458 | 1.7830 |
| −0.0079 | −0.2550 | 1.8578 |
| −0.0153 | −0.2161 | 1.9046 |
| −0.0199 | −0.1637 | 1.9257 |
| −0.0207 | −0.1361 | 1.9742 |
| −0.0156 | −0.1702 | 2.0487 |
| −0.0111 | −0.2092 | 2.0626 |

With reference to FIG. 4, the tip contour of each turbine blade 52, 54 is defined relative a hub contour of hub 50. The tip contour closely matches the adjacent turbine shroud 38 with offset clearance to provide a desired rotor performance.

The tip contour of each turbine blade 52, 54 is dimensionally defined herein by a paired axial dimension K and radial dimension J. The hub contour of the hub 50 is dimensionally defined by a paired axial dimension M and radial dimension L.

The paired dimensions J, K and L, M are provided in table C-1 to define the tip contour of each turbine blade 52, 54 along the span thereof. Characteristics of the shape may change from one to another and each may be directly scaled up or scaled down scaled by a desired factor to meet different requirements.

The tip profile is disclosed in terms of the axial dimension K and the radial dimension J and the hub profile is disclosed in terms of the axial dimension M and the radial dimension L in the respective Tables. The J and M coordinates are defined in a generally radial direction relative to the axis of Rotation A and as related to Datum B. The J and M coordinate values for determining the respective tip and hub profile at the associated axial coordinate K and M in the Tables are provided as a ratio with respect to Datum B. That is, the J and M coordinate values in the Tables herein represent a non-dimensionalized value equal to one (1) at Datum B. It should be understood that a variety of reference Datums may alternatively or additionally be used.

The Table values are provided in inches, and represent actual airfoil profiles at ambient, non-operating or non-hot conditions for an uncoated airfoil, the coatings for which are described below.

TABLE C-1

| Tip | | Hub | |
|---|---|---|---|
| K | Ratio (J Rad/-B-) | M | Ratio (L Rad/-B-) |
| −0.9342 | 1.4376 | −1.0637 | 1.0518 |
| −0.9116 | 1.4376 | −1.0261 | 1.0518 |
| −0.8847 | 1.4376 | −1.0004 | 1.0518 |
| −0.8636 | 1.4376 | −0.9236 | 1.0518 |
| −0.8223 | 1.4384 | −0.9143 | 1.0518 |
| −0.7542 | 1.4419 | −0.8403 | 1.0523 |
| −0.7211 | 1.4443 | −0.7888 | 1.0544 |
| −0.6799 | 1.4485 | −0.7447 | 1.0579 |
| −0.6015 | 1.4619 | −0.6334 | 1.0735 |
| −0.5277 | 1.4874 | −0.5653 | 1.0888 |
| −0.5001 | 1.5018 | −0.4819 | 1.1171 |
| −0.4667 | 1.5252 | −0.4097 | 1.1533 |
| −0.4203 | 1.5722 | −0.3608 | 1.1854 |
| −0.3780 | 1.6337 | −0.2832 | 1.2540 |
| −0.3391 | 1.7112 | −0.2182 | 1.3352 |
| −0.3080 | 1.7899 | −0.1911 | 1.3811 |

TABLE C-1-continued

| Tip | | Hub | |
|---|---|---|---|
| K | Ratio (J Rad/-B-) | M | Ratio (L Rad/-B-) |
| −0.2775 | 1.8826 | −0.1610 | 1.4457 |
| −0.2566 | 1.9555 | −0.1320 | 1.5306 |
| −0.2401 | 2.0202 | −0.1003 | 1.6766 |
| −0.2179 | 2.1177 | −0.0834 | 1.8038 |
| | | −0.0739 | 1.9583 |
| | | −0.0699 | 2.0654 |
| | | −0.0681 | 2.1136 |
| −0.2118 | 2.1471 | −0.0667 | 2.1518 |
| −0.2060 | 2.1753 | −0.0658 | 2.1739 |

As the aforementioned airfoils heat up during operation, applied stresses and temperatures induced to the airfoils may inevitably cause some deformation of the airfoil shape, and hence there is some change or displacement in the Table coordinate values. While it is not possible to measure the changes in the Table coordinate values in operation, it has been determined that the Table coordinate values plus the deformation in use, enables efficient, safe and smooth operation.

It is appreciated that the Table coordinate values may be scaled up or down geometrically in order to be introduced into other similar machine designs. It is therefore contemplated that a scaled version of the Table coordinate values set forth may be obtained by multiplying or dividing each of the Table coordinate values by a predetermined constant n. It should be appreciated that the Table coordinate values could be considered a scaled profile with n set equal to 1, and greater or lesser dimensioned components are obtained by adjusting n to values greater and lesser than 1, respectively.

The Table coordinate values are computer-generated and disclosed to four decimal places. However, in view of manufacturing constraints, actual values useful for manufacture of the component are considered to be the values to determine the claimed profile. There are, for example, typical manufacturing tolerances which must be accounted for in the profile. Accordingly, the Table coordinate values are for a nominal airfoil. It will therefore be appreciated that plus or minus typical manufacturing tolerances are applicable to these Table coordinate values and that an airfoil having a profile substantially in accordance with those values includes such tolerances. For example, a manufacturing tolerance of about .+−.0.030 inches normal to the blade surface should be considered within design limits for the airfoil. Thus, the mechanical and aerodynamic function of the airfoils is not impaired by manufacturing imperfections and tolerances, which in different embodiments may be greater or lesser than the values set forth above. As appreciated by those in the art, manufacturing tolerances may be determined to achieve a desired mean and standard deviation of manufactured airfoils in relation to the ideal airfoil profile points set forth in the Tables.

In addition, the component may also be coated for protection against corrosion and oxidation after the component is manufactured, according to the values of the Tables and within the tolerances explained above. Consequently, in addition to the manufacturing tolerances for Table coordinate values, there may also be an addition to account for the coating thicknesses. It is contemplated that greater or lesser coating thickness values may be employed in alternative embodiments of the invention. Consequently, in addition to the manufacturing tolerances, there is also a modification to the Table coordinate values to account for the coating thicknesses. It is contemplated that greater or lesser coating thickness values may be employed in alternative embodiments of the invention.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present invention.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the invention may be practiced other than as specifically described. For that reason the appended claims should be studied to determine true scope and content.

What is claimed:

1. A turbine rotor for an Air Cycle Machine comprising:
   a hub with a multiple turbine blades which extend therefrom, each of said multiple of turbine blades defined by a set of X-coordinates, Y-coordinates and Z-coordinates in any of Table B-1 and B-2 scaled by a desired factor or Table S-1 and S-2 scaled by a desired factor, said X-coordinate is the tangential direction, said Y-coordinate is the axial direction, and said Z-coordinate is the radial direction.

2. The turbine rotor as recited in claim 1, wherein said multiple turbine blades have a tip contour defined by a set of points in Table C-1 scaled by a desired factor, said set of points include paired axial dimension K from a centerline of the turbine rotor and a radial dimension J from a reference surface.

3. The turbine rotor as recited in claim 2, wherein said hub has a hub contour defined by a set of points in Table C-1 scaled by a desired factor, said set of hub contour points include paired axial dimension M from a centerline of the turbine rotor and a radial dimension L from a reference surface.

4. The turbine rotor as recited in claim 1, wherein said hub has a hub contour defined by a set of points in Table C-1 scaled by a desired factor, said set of points include paired axial dimension M from a centerline of the turbine rotor and a radial dimension L from a reference surface.

5. The turbine rotor as recited in claim 1, wherein each of said Tables is adjusted by a manufacturing tolerance.

6. The turbine rotor as recited in claim 5, wherein said manufacturing tolerance is about +−0.03 inches (0.76 mm).

7. A turbine rotor for an Air Cycle Machine comprising:
   a hub with a multiple turbine blades which extend therefrom, each of said multiple of turbine blades have a tip contour defined by a set of points in Table C-1 scaled by a desired factor, said set of points include paired axial dimension K from a centerline of the turbine rotor and a radial dimension J from a reference surface.

8. The turbine rotor as recited in claim 7, wherein each of said multiple of turbine blades are defined by a set of X-coordinates, Y-coordinates and Z-coordinates in any of Table B-1 and B-2 scaled by a desired factor or Table S-1 and S-2 scaled by a desired factor, said X-coordinate is the tangential direction, said Y-coordinate is the axial direction, and said Z-coordinate is the radial direction.

9. The turbine rotor as recited in claim 7, wherein said hub has a hub contour defined by a set of points in Table C-1 scaled by a desired factor, said set of hub contour points include paired axial dimension M from a centerline of the turbine rotor and a radial dimension L from a reference surface.

10. The turbine rotor as recited in claim 7, wherein each of said Tables is adjusted by a manufacturing tolerance.

11. A turbine rotor for an Air Cycle Machine comprising:
    a hub with a multiple turbine blades which extend therefrom, said hub has a hub contour defined by a set of points in Table C-1 scaled by a desired factor, said set of points include paired axial dimension M from a centerline of the turbine rotor and a radial dimension L from a reference surface.

12. The turbine rotor as recited in claim 11, wherein said multiple turbine blades have a tip contour defined by a set of points in Table C-1 scaled by a desired factor, said set of tip contour points include paired axial dimension K from a centerline of the turbine rotor and a radial dimension J from a reference surface.

13. The turbine rotor as recited in claim 11, wherein each of said multiple of turbine blades are defined by a set of X-coordinates, Y-coordinates and Z-coordinates in any of Table B-1 and B-2 scaled by a desired factor or Table S-1 and S-2 scaled by a desired factor, said X-coordinate is the tangential direction, said Y-coordinate is the axial direction, and said Z-coordinate is the radial direction.

14. The turbine rotor as recited in claim 11, wherein each of said Tables is adjusted by a manufacturing tolerance.

15. An Air Cycle Machine comprising:
    a turbine rotor with a multiple turbine blades, each of said multiple of turbine blades having a set of X-coordinates, Y-coordinates and Z-coordinates defined in any of Table B-1 and B-2 scaled by a desired factor or Table S-1 and S-2 scaled by a desired factor, said X-coordinate is the tangential direction, said Y-coordinate is the axial direction, and said Z-coordinate is the radial direction.

16. The Air Cycle Machine as recited in claim 15, wherein said multiple turbine blades have a tip contour defined by a set of points in Table C-1 scaled by a desired factor, said set of points include paired axial dimension K from a centerline of the turbine rotor and a radial dimension J from a reference surface.

17. The Air Cycle Machine as recited in claim 15, wherein said hub has a hub contour defined by a set of points in Table C-1 scaled by a desired factor, said set of points include paired axial dimension M from a centerline of the turbine rotor and a radial dimension L from a reference surface.

18. The Air Cycle Machine as recited in claim 15, wherein said turbine rotor is within a turbine shroud.

19. The Air Cycle Machine as recited in claim 15, further comprising a turbine nozzle upstream of said turbine rotor.

20. The Air Cycle Machine as recited in claim 15, wherein each of said Tables is adjusted by a manufacturing tolerance.

21. A method of installing a turbine rotor in an Air cycle Machine, comprising:
    mounting a turbine rotor with a multiple turbine blades within a turbine shroud to at least partially define a turbine flowpath, each of said multiple of turbine blades having a set of X-coordinates, Y-coordinates and Z-coordinates defined in any of Table B-1 and B-2 scaled by a desired factor or Table S-1 and S-2 scaled by a desired factor, said X-coordinate is the tangential direction, said Y-coordinate is the axial direction, and said Z-coordinate is the radial direction.

22. A method as recited in claim 21, further comprising: mounting the turbine rotor downstream of a turbine nozzle.

23. A method as recited in claim 21, further comprising: defining said multiple turbine blades to have a tip contour defined by a set of points in Table C-1 scaled by a desired factor, said set of points include paired axial dimension K from a centerline of the turbine rotor and a radial dimension J from a reference surface to follow a contour of the turbine shroud.

24. A method as recited in claim 21, further comprising: adjusting a wall inner surface defined by the set of points in each of the Tables by a manufacturing tolerance.

* * * * *